(12) United States Patent
Luke et al.

(10) Patent No.: US 11,440,504 B2
(45) Date of Patent: Sep. 13, 2022

(54) SYSTEMS FOR OPERATING A VEHICLE AND ASSOCIATED METHODS

(71) Applicant: Gogoro Inc., Hong Kong (CN)

(72) Inventors: Hok-Sum Horace Luke, Mercer Island, WA (US); Chun-Sheng Hsu, Taoyuan (TW); Yung-Chung Hu, Taoyuan (TW); Jia-Yang Wu, Taoyuan (TW); Yu-Sheng Huang, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 15/944,759

(22) Filed: Apr. 3, 2018

(65) Prior Publication Data

US 2018/0290628 A1 Oct. 11, 2018

Related U.S. Application Data

(60) Provisional application No. 62/482,119, filed on Apr. 5, 2017.

(51) Int. Cl.
*B60R 25/24* (2013.01)
*B60R 25/20* (2013.01)
(Continued)

(52) U.S. Cl.
CPC .......... *B60R 25/246* (2013.01); *B60R 25/008* (2013.01); *B60R 25/209* (2013.01);
(Continued)

(58) Field of Classification Search
CPC .......... B60R 2325/306; B60R 2325/40; B60R 25/008; B60R 25/20; B60R 25/209;
(Continued)

(56) References Cited

U.S. PATENT DOCUMENTS

2002/0019947 A1* 2/2002 Umezawa ............... G06F 21/83
726/5
2003/0218642 A1* 11/2003 Sakayori ............... G09B 21/00
715/853
(Continued)

FOREIGN PATENT DOCUMENTS

CN 101046897 A 10/2007
CN 101192317 A 6/2008
(Continued)

OTHER PUBLICATIONS

European Patent Office Searching Authority, International Search Report and Written Opinion for International Application No. PCT/US2018/025963, dated Jun. 26, 2018, 16 pages.
(Continued)

*Primary Examiner* — Yong Hang Jiang
(74) *Attorney, Agent, or Firm* — Perkins Coie LLP

(57) ABSTRACT

The present disclosure relates to methods and associated systems for unlocking a vehicle. The vehicle has a first input device and a second input device. The method includes (1) receiving a passcode from the first input device; (2) receiving a confirmation of the passcode from the second input device; and (3) in response to the confirmation, storing the passcode in a storage device associated with the vehicle. The passcode is input by operating the first input device in a first predetermined way, and, the confirmation is input by operating the second input device in a second predetermined way.

23 Claims, 14 Drawing Sheets

(51) Int. Cl.
*H04L 9/08* (2006.01)
*H04L 9/32* (2006.01)
*B60R 25/00* (2013.01)
*G07C 9/00* (2020.01)
*G07C 9/30* (2020.01)

(52) U.S. Cl.
CPC .......... *B60R 25/241* (2013.01); *G07C 9/0069* (2013.01); *G07C 9/30* (2020.01); *H04L 9/0877* (2013.01); *H04L 9/32* (2013.01); *B60R 25/20* (2013.01); *B60R 2325/306* (2013.01); *B60R 2325/40* (2013.01)

(58) Field of Classification Search
CPC . B60R 25/241; B60R 25/246; G07C 9/00126; G07C 9/0069; H04L 9/0877; H04L 9/32
See application file for complete search history.

(56) References Cited

U.S. PATENT DOCUMENTS

| | | | |
|---|---|---|---|
| 2007/0228829 A1* | 10/2007 | Konno | B60R 25/02142 307/10.5 |
| 2008/0150682 A1 | 6/2008 | Shii | |
| 2008/0231477 A1* | 9/2008 | Kim | G06F 3/04847 341/20 |
| 2009/0021361 A1 | 1/2009 | Yoshizawa et al. | |
| 2010/0282210 A1* | 11/2010 | Itagaki | F02D 37/02 123/399 |
| 2011/0258435 A1* | 10/2011 | Bellur | H04L 9/3273 713/158 |
| 2015/0102898 A1* | 4/2015 | Huennekens | G07C 9/00174 340/5.6 |
| 2016/0371907 A1 | 12/2016 | Ma et al. | |
| 2017/0116800 A1 | 4/2017 | Lin et al. | |

FOREIGN PATENT DOCUMENTS

| | | |
|---|---|---|
| CN | 105869237 | 8/2016 |
| DE | 4424879 | 1/1996 |
| EP | 1939820 A2 | 7/2008 |
| JP | H11-324433 A | 11/1999 |
| JP | 2007-269235 A | 10/2007 |
| JP | 2007-334586 A | 12/2007 |
| JP | 2008-137424 A | 6/2008 |
| JP | 2008-162498 A | 7/2008 |
| JP | 2009-202671 A | 9/2009 |
| JP | 2013-147202 A | 8/2013 |
| JP | 2016-193623 A | 11/2016 |
| KR | 20160070519 A | 6/2016 |
| WO | 2018187383 | 10/2018 |

OTHER PUBLICATIONS

Indian Examination Report received for Indian Application No. IN201917031839, dated Apr. 27, 2021, 6 pages.

* cited by examiner

| Combinations | Input Device A | Input Device B | ... | Input Device X |
|---|---|---|---|---|
| Unlock power | Action A1 | Action B1 | ⋮ | No Action |
| Unlock motor | Action A2 | Action B2 | ⋮ | Action X2 |
| ... | ... | ... | ⋮ | ... |
| Unlock Seat Cover | No Action | Action B9 | ⋮ | Action X9 |

400B

401 → Unlock power
403 → Unlock motor
405 → Unlock Seat Cover

*FIG. 4B*

SYSTEMS FOR OPERATING A VEHICLE AND ASSOCIATED METHODS

CROSS-REFERENCE TO RELATED APPLICATION

The present application claims the benefit of and priority to U.S. Provisional Application No. 62/482,119, filed Apr. 5, 2017, which is incorporated herein by reference in its entirety.

TECHNICAL FIELD

The present technology is directed to systems and methods for maintaining security of a vehicle. More particularly, the present technology is directed to systems and methods for enabling/disabling or locking/unlocking mechanical or other features of a vehicle by operating one or more existing components thereof.

BACKGROUND

User authentication systems for vehicles are used to prevent unauthorized users from accessing, or operating, or stealing vehicles. Traditional user authentication systems include physical keys or radio frequency fobs. Such traditional systems require authorized users to insert the keys into, or present the fobs to, the vehicle to complete an authentication process. If a key for a traditional system is lost and found by an unauthorized user, the vehicle will grant access to the unauthorized user. In other words, the security of the traditional system can be easily compromised by simply losing the keys or fobs. Therefore, it is advantageous to have an improved system to address this issue.

SUMMARY

The disclosed technology is directed to a method for operating a vehicle. The method includes, for example, (1) generating a passcode in response to a detected actuation of a first input device disposed on the vehicle; (2) comparing the generated passcode with a reference code stored in a memory disposed in the vehicle; and (3) enabling one or more features of the vehicle if the generated passcode matches the reference code. The "detected actuation" can be a rotation of the first input device (e.g., throttle handle) or a holding operation (e.g., positioning) of the first input device. In some embodiments, the "features" can be any suitable functions of the vehicle, such as turning on or activating an engine of the vehicle, granting access to a compartment (e.g., open a lid that covers the compartment) of the vehicle.

Another aspect of the disclosed technology is directed to a vehicle that includes (1) a memory, (2) a processor coupled to the memory; and (3) a first input device coupled to the processor. The processor is configured to (1) generate a passcode, in response to a detected actuation of the first input device; (2) compare the generated passcode with a reference code stored in the memory; and (3) enable one or more features of the vehicle if the generated passcode matches the reference code. In some embodiments, the "detected actuation" can include rotating the first input device and positioning the first input device at a predetermined angle. In some embodiments, the "detected actuation" can include (1) positioning the first input device at a predetermined location and (2) confirming the predetermined location by a second input device. In some embodiments, the "detected actuation" can be an event detected by a suitable sensor such as a position/location sensor, a hall-effect sensor corresponding to the relative movement of the first input device, an accelerating sensor, a Gyro sensor, or a sensor that can senses a current or voltage.

Another aspect of the disclosed technology is directed to a system that can authorize a vehicle to operate based on a reference code stored in a remote server. The vehicle can include a processor and a first input device coupled to the processor. The processor is configured to (1) generate a passcode, in response to a detected actuation of the first input device; (2) receive the reference code from the remote server (e.g., via the Internet); (3) compare the generated passcode with the reference code; and (4) enable one or more features of the vehicle if the generated passcode matches the reference code.

BRIEF DESCRIPTION OF THE DRAWINGS

Embodiments of the disclosed technology will be described and explained through the use of the accompanying drawings.

FIGS. 4A and 4B are schematic diagrams illustrating data structure used in systems in accordance with embodiments of the disclosed technology.

Figure 1A:
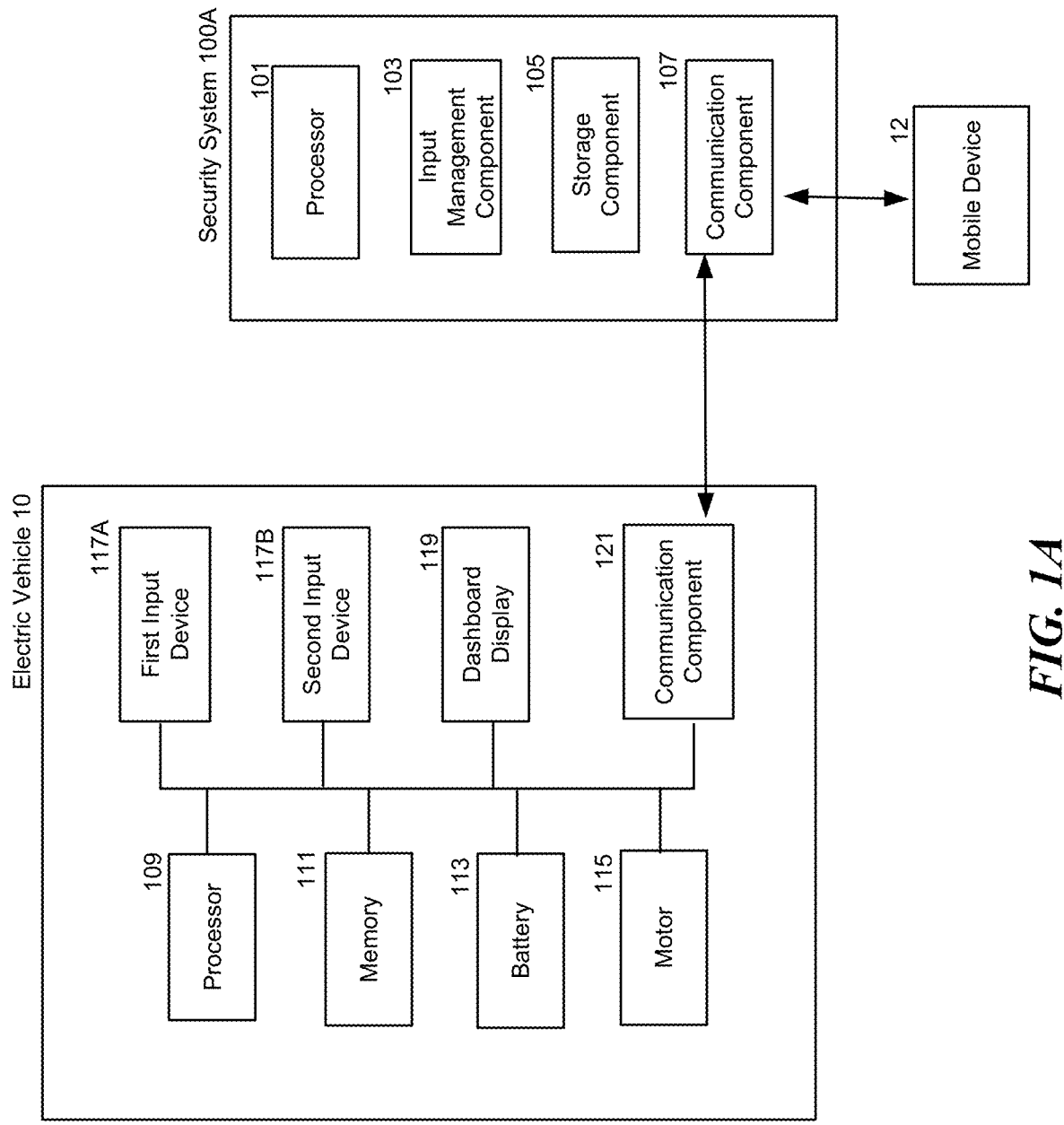
FIG. 1A is a schematic diagram illustrating a system in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiments," "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to a method and system for enabling certain feature(s) on a vehicle (e.g., a scooter, an electric scooter, a gas-fueled or an electric motorcycle, a four-wheeled gas-fueled/electric vehicle, etc.) by operating a combination of existing components of the vehicle. The present technology enables a user to set up a combination of how to operate these components (e.g., as a passcode), and then use the combination to enable/unlock mechanical or other features of the vehicle. The present technology enables a user to select one or more "input devices" of the vehicle as part of the combination. The input devices are existing components of the vehicle such as: a functional button, rotatable throttle-control handle (or "throttle handle"), handle, lever, steering wheel, handle bars, pedal, paddle, shifter, side stand, trunk lid, fuel lid/cap, power plug or other features whose status (open, closed, engaged, not engaged, rotational position etc. can be sensed). Operating the input devices in a predetermined way (e.g., to press, rotate, move, position, hold, etc.), defines a passcode that a programmed processor or other logic circuit either in or logically associated with the system can compare with a reference passcode. If the received passcode matches the reference passcode, the system grants the user access to the vehicle. In some embodiments, the status of a component can be called as an "operational condition." For example, a component can have 10 operational conditions, each of which can correspond to a passcode digit.

In some embodiments, the system can be implemented as a supplemental security mechanism in addition to a traditional authentication system (e.g., using physical keys or fobs).

In some embodiments, the present technology can be implemented as a stand-alone system that can be installed in a vehicle (embodiments to be discussed in detail with reference to FIG. 1A). In some embodiments, the present technology can be implemented as a part of a vehicle control system (embodiments to be discussed in detail with reference to FIG. 1B). In other embodiments, the present technology can be implemented in a mobile device (e.g., a smartphone with an app installed) that is capable of communicating with a vehicle.

One aspect of the present technology includes providing a vehicle security system that enables a user to manage multiple vehicles in a network (e.g., fleet vehicles of a company, a group of vehicles of a family, vehicles of a vehicle-rental company, etc.). The present technology enables a user to manage the accessibility of the vehicles in various groups via a cloud server. For example, the user can issue different passcodes for authorized drivers who purchase different plans (e.g., plan A allows a driver to ride a scooter at a higher speed than plan B). The vehicles in the network can also communicate with one another regarding passcodes (e.g., share most updated passcodes). Such embodiments are discussed in further detail below with reference to FIG. 3.

Another aspect of the present technology enables a user to create (and/or frequently update) his/her own combinations of passcodes so as to enhance vehicle security. For example, the present system enables the user to pick a first input device of a vehicle as a component to input passcodes. For example, the user can use a throttle handle of a scooter to enter a passcode by rotating/positioning the throttle handle at different angles/locations. Assuming that the throttle handle can be rotated in a range of 180 degrees, then the range can be divided by ten such that each divided degree range (e.g., a 18-degree range) represents a single digit number (e.g., 0 to 9). In some embodiments, the degree range can be divided by other numbers (e.g., 16 or 26) and accordingly the positions of the throttle in each divided range can represent other characters or symbols (e.g., hexadecimal numbers or letters of the English alphabet) that can be used to form a passcode. In some embodiments, each degree range can be different due to the characteristics of the first input device (e.g., sensitivity or responsiveness of the first input device can vary in different degree ranges). In some embodiments, there can be various sensors or electronic components (e.g., a variable resistor, a potentiometer, etc.) positioned at multiple locations such that the location of the first input device can be sensed or detected. For example, in some embodiments, the throttle handle can be an electronic throttle. In such embodiments, an output voltage or current of the throttle handle can vary corresponding to an angle of rotation of the throttle handle. In some other embodiments, a hall-effect sensor can be disposed on the throttle handle, and the hall-effect sensor can monitor the rotation of the throttle handle (i.e., the relative movements between the stationary part and the rotatable part of the throttle handle) by sensing magnetic-field variation (e.g., caused by the rotation). Based on the sensed location of the first input device, a passcode can accordingly be determined.

In some embodiments, the system also enables the user to pick a second input device to confirm all or portions of a passcode or enter an additional passcode. For example, the user can use a brake lever (or a brake pedal) to confirm passcode component that is input by the first input device (e.g., a "confirmatory" or "confirmational" operation). In other embodiments, the passcode component can be confirmed by other means (e.g., the confirmatory operation can be, holding the first input device for a certain time period). Relevant embodiments are to be discussed in detail below with reference to FIGS. 4A and 4B.

Yet another aspect of the present technology includes providing a user interface to facilitate a user's input of a passcode or setting up passcode components (e.g., numbers, letters, symbols, etc.) corresponding to specific operations or conditions of a vehicle component (e.g., as part of an "input device" mentioned above). Examples of the user interface are to be discussed below with reference to FIGS. 7A-8.

In some embodiments, the present technology enables a user to determine a security level of a vehicle. For example, the present technology can provide recommendations to the user regarding whether to enable an "enhanced security" or "security boost" feature (e.g., using a passcode to unlock the vehicle in addition to a physical lock) of the vehicle. In some embodiments, the recommendations can be based on information such as user profile, a current location of the vehicle, associated crime rates of a location, news associated with a location (e.g., a vehicle was reported stolen last night near a location), etc.

In some embodiments, the recommendations are transmitted to the user via a user mobile device. Once the user decides to enable the "security boost" features, the user is invited to enter the passcode for accessing the vehicle from the mobile device (e.g., a user interface for entering the passcode; this can be an application running on the mobile phone; detailed embodiments are discussed with respect to FIGS. 7A-7D), and then the passcode can be sent to the vehicle and be stored as a reference code for security verification. In some embodiments, a default configuration is to enable the security boost feature, and the passcode can be stored in the mobile device (e.g., to "remind" the user what the passcode is) and/or in the vehicle (as the reference code for security verification). In some embodiments, the default configuration can be determined based on the user's insurance policy for the vehicle. In some embodiments, the present technology can generate a report summarizing the security features of a vehicle and transmit the report to a user's insurance provider.

In some embodiments, the present technology determines whether to activate the security boost feature based on an available energy level of a vehicle. For example, when the available energy level is lower than a first threshold (e.g., 5% of a full capacity), the present technology disables the security boost feature. In some embodiments, when the available energy level reaches a second threshold, the present technology sends a notification to a user and recommends that the user adjust a current security configuration. In some embodiments, the present technology includes a backup, independent power source (e.g., a battery) configured to make sure that the security boost feature can be implemented even when the available energy level of the vehicle is too low to properly operate the vehicle. In some embodiments, there can be a "controller battery" or "ECU battery" configured to provide power to a controller or an ECU (electric control unit or engine control unit) of the vehicle, when a "main battery" (e.g., which is configured to power an electric motor of the vehicle) of the vehicle is switched off. In some embodiments, the "main battery" can be used to charge the "controller battery," so as to make sure the "controller battery" has sufficient power to support the operation of the controller or ECU.

In some embodiments, the present technology enables a user to store/upload a picture, a description and/or other suitable information such as a hint regarding the passcode/combination he or she created, just in case the user forgets the combination. In some embodiments, the stored/upload information can be accessible via a user's mobile device.

FIG. 1A is a schematic diagram illustrating a security system 100A in accordance with embodiments of the disclosed technology. As shown, the security system 100A can communicate with an electric vehicle 10 and/or a mobile device 12. In some embodiments, the mobile device 12 can include a smartphone, a tablet, a smart watch, a notebook, other type of computing device, etc. In some embodiments, the electric vehicle 10 can be an electric scooter. In some embodiments, the system 100A can communicate with the electric vehicle 10 and the mobile device 12 via a wireless network (e.g., Wi-Fi, 3G/4G/5G, Bluetooth, infrared etc.). In some embodiments, the wireless communication network between the communication components 121 and 107 can be different from the wireless communication network between the communication component 107 and the mobile device 12. As shown, the electric vehicle 10 includes a processor 109, a memory 111, a battery 113, a motor 115, a first input device 117A, a second input device 117B, a dashboard display 119, and a communication component 121. The processor 109 is configured to interact with the memory 111 and other components (e.g., components 113-121) in the electric vehicle 10. The memory 111 is coupled to the processor 109 and configured to store instructions for controlling other components or other information in the electric vehicle 10. The battery 113 is configured to power the motor 115 such that the motor 115 can move the electric vehicle 10. The dashboard display 119 is configured to visually present information to a user (e.g., via a user interfaces shown in FIGS. 7A-8). The communication component 121 is configured to communicate with other systems (e.g., the security system 100A) and other devices (e.g., the mobile device 12) in wired or wireless communication based on the configuration between the electric vehicle 10 and other systems/devices.

As shown in FIG. 1A, the security system 100A includes a processor 101, an input management component 103, a storage component 105, and a communication component 107. The processor 101 is configured to control other components of the system 100A and to execute instructions to perform desired operations. The input management component 103 is configured to communicate (e.g., via the communication components 107, 121) with the first and second input devices 117A, 117B and accordingly receive passcodes and/or confirmatory input by a user. In some embodiments, the processor of the vehicle and the processer of the security system may be the same such that the components of the security system are implemented by a single processor.

In the illustrated embodiments, the first input device 117A is configured to be operated in a predetermined way such that a user can input a passcode or portion thereof using the first input device. For example, the first input device 117A can include a throttle control handle, rotatable in an angle range (e.g., 0-90 degrees, etc.). By rotating the throttle control handle to different angles, the user can input a passcode (which includes one or more passcode components). In this embodiment, the angle range can be divided into 10 divided ranges. For illustration, if the total angle range for the throttle is 40 degrees, the divided ranges can be divided into 10 ranges: 0-4, 5-8, 9-12, 13-16, 17-20, 21-24, 25-28, 29-32, 33-36 and 37-40 degrees. Each divided range represents or corresponds to a unique single-digit number (e.g., 0 to 9). These single-digit numbers can be combined as a passcode component which defines the passcode. In some embodiments, the passcode components can include a letter, a string, a symbol, etc. As can be appreciated, other detectable ranges of throttle rotation commonly used (e.g., 0-90 degrees) can be similarly detected and associated with different input values.

In some embodiments, the second input device 117B is configured to enable the user to confirm his/her input encoded by the first input device 117A. For example, when the user holds the first input device 117A at a particular angle or position, the user can then operate the second input device 117B (e.g., a button, handle etc.) in a predetermined manner (e.g., press the button, squeeze the handle, etc.) to confirm the user's input. In other embodiments, the user's input can be confirmed by other means. For example, the second input device can be a brake handle, and when the user holds the first input device 117A in a set position for a time period, then the corresponding input is confirmed. For example, the user rotates the throttle to 40 degrees and the user is shown the number 6 on a display. The user squeezes the brake handle to accept the number 6. The user then rotates the handle to 20 degrees and is shown the number 3 on the display. The user then squeezes the handle again to accept the number. The code or portion thereof is therefore "63" to which additional numbers can be added in the same manner to complete the code.

In some embodiments, the first and second input devices 117A, 117B are "existing" components of the electric vehicle 10, and therefore perform functions other than inputting/confirming passcodes when the vehicle is operating. For example, the brake lever activates the brakes on a scooter. The same circuitry that activates the brake lights of the scooter is used to provide a signal to the processor of the security system for use by the security system to indicate that the user has accepted a security code. Similarly the same circuitry that detects the portion of the throttle for determining how fast to run the motor is used by the security system to show different code values to the user etc. Advantages of this arrangement include that the present technology can cooperate with or be implemented in various types of vehicle systems without requiring additional input devices/components. In other embodiments, however, the system can include one or more additional input devices configured to receive a user passcode. In some embodiments, when the vehicle is turned off, the ECU of the vehicle (e.g., the processor 109 of the electric vehicle 10) can switch the first and second input device from their "operational modes" to "passcode-input" modes. By this arrangement, the first/second input devices can be used to input passcodes before the vehicle is turned on again. For example, when a throttle handle is in its "operational mode," it can be rotated to control the throttle (i.e., the power output of the powertrain unit such as motor or engine). When the throttle handle is in its "passcode-input mode," it can be rotated to enter passcodes, as discussed herein. As another example, when a brake handle is in its "operational mode," it can be squeezed to control the brake of the vehicle. When the brake handle is in its "passcode-input mode," it can be used (e.g., as the second input device) to confirm the passcodes entered by the throttle handle.

Once a passcode is received by the input management component 103, the passcode can be stored in the storage component 105. The storage component 105 is configured to store, temporarily or permanently, information/data/files/signals associated with the system 100A (e.g., passcodes, relationships between passcode components and the operations/conditions of an input device). For example, the storage component 105 can store a reference passcode used to authenticate the received passcode. In some embodiments, the storage component 105 can be a hard disk drive, flash memory, or other suitable storage means. In some embodiments, the storage component 105 can be included in the electric vehicle 10. In some embodiments, when a user inputs a passcode component, the passcode component is shown in the dashboard display 119. Embodiments of a user interface of the dashboard display 119 are to be discussed below with reference to FIG. 8.

In some embodiments, the security system 100A can be implemented by the processor on the vehicle or as a separate component on the vehicle such as a system-on-chip (SOC) system that can perform the functions described above. In some embodiments, the security system 100A interacts with a remotely located processor. For example, the detected component movements or activations can be transmitted to a processor on a smart phone or other device associated with the operator via Bluetooth or infrared that compares the settings with a pre-stored code and the remote processor sends back a signal to unlock the vehicle or feature depending on the settings received. In this way, the processor of the vehicle may be less likely to be compromised by malicious software to defeat the security feature.

Figure 1B:
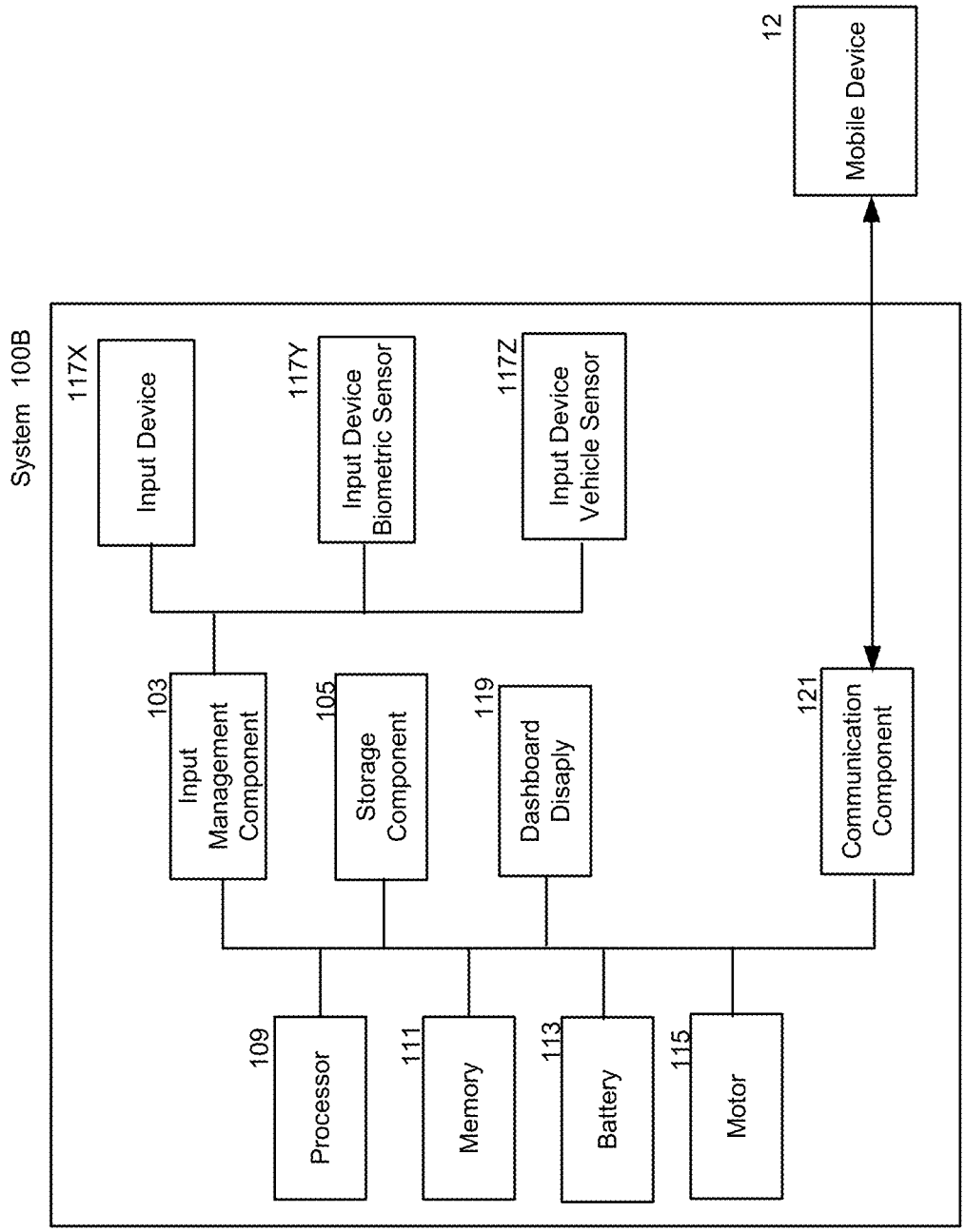
FIG. 1B is a schematic diagram illustrating a system in accordance with embodiments of the disclosed technology.

FIG. 1B is a schematic diagram illustrating a system 100B in accordance with embodiments of the disclosed technology. The system 100B is implemented in an electric vehicle. The system 100B includes a processor 109, a memory 111, a battery 113, a motor 115, a dashboard display 119 and a communication compoent 121. These components have functions generally similar to those discussed in FIG. 1A. The system 100B includes an input management component 103 coupled to the processor 109 and to input devices 117X, 117Y and 117Z. The input management component 103 is configured to receive a passcode input by a user via operating the input devices 117X, 117Y and/or 117Z.

The input device 117X can perform functions similar to those of the first and second input devices 117A, 117B described above in FIG. 1A. The input device 117Y includes a biometric sensor configured to receive biometric information (e.g., fingerprints, palm prints, voices, iris or retinal images, etc.) from a user. The collected biometric information can be used to further verify the identity of the user. In some embodiments, the input device 117Y can also be configured to be operated in a predetermined way such that a user can input a passcode. For example, the input device 117Y can be a touch pad (which can have a plurality of pressure or optical sensors) used to measure/analyze a user's finger print. In this embodiment, a user can use his/her finger to draw various lines or patterns on the touch pad, and these various lines or patterns can represent different passcode components. In some embodiments, the touch pad can be a touch screen. In some embodiments, the touch pad can include a fingerprint or palm print sensor.

In some embodiments, the input device 117Y can also be configured to be operated in a predetermined way such that a user can input a passcode. The input device 117Z can include a sensor configured to measure a status of the system 100B. For example, the input device 117Z can be a pressure sensor used to detect whether a user is sitting on a driver seat of the system 100B. In such embodiments, the user can input multiple passcode components by sitting on the driver seat for different periods of time or at different locations (e.g., left or right side of the driver seat). In other embodiments, the user can input a passcode and confirm passcode components by operating one or more of the input devices 117X-117Z.

In some embodiments, the input management component 103 is configured to enable a user to set up relationships between passcode components and the operations/conditions of the input devices 117X-117Z. In some embodiments, the system 100B enables a user to set up the foregoing relationships via the mobile device 12. In some embodiments, the input management component 103 can be implemented as a software application installed in the mobile device 12. In such embodiments, the input management component 103 communicates with one or more input devices of a vehicle. When a user operates the input devices to enter a passcode for authentication, the input management component 103 receives the operating conditions/statuses of the input devices, and then identifies one or more passcode components so as to form the passcode. The passcode can then be used to authenticate the user.

Figure 1C:
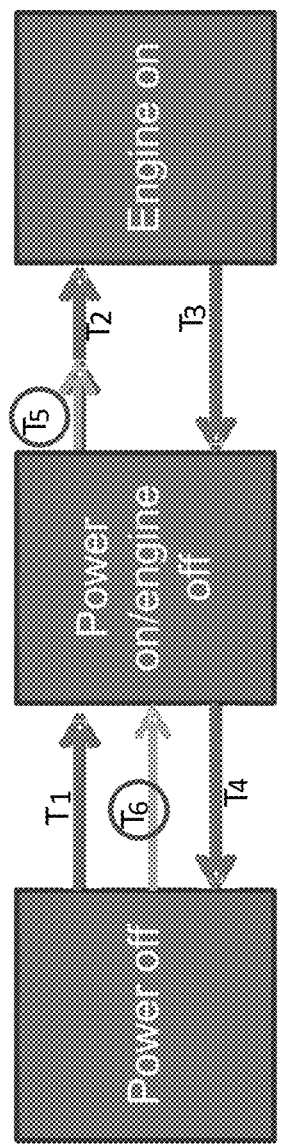
FIG. 1C is a schematic diagram illustrating multiple statuses of a vehicle in accordance with embodiments of the disclosed technology.

FIG. 1C is a schematic diagram illustrating multiple status conditions of a vehicle in accordance with embodiments of the disclosed technology. As shown, the vehicle includes three status conditions, "Power off," "Power On/engine off," and "Engine on." In some embodiments, the "Power off" status refers to a situation where a main power supply (e.g., a battery) of the vehicle is turned off and only some of the vehicle components is/are operating. For example, a wired/wireless communication component of a processor (e.g., an Electric Control Unit or Engine Control Unit, ECU) can be in a stand-by mode to receive signals, such as unlocking signals from a key fob or from a mobile device. In some embodiments, the "Power On/engine off" status refers to a situation where a main power supply, an ECU, a Micro Controller Unit or Motor Control Unit (MCU), peripheral components (e.g., lighting components, a dashboard display, etc.) are enabled/turned on, but an engine or a motor (e.g., an electric motor) of the vehicle remains off. In some embodiments, the "Engine on" status means that the engine or motor of the vehicle is activated/turned on and therefore the vehicle is ready to travel. In some embodiments, the "engine on/off" can mean "motor on/off," "powertrain on/off," "motor enable/disable," or "powertrain enable/disable."

Figure 8:
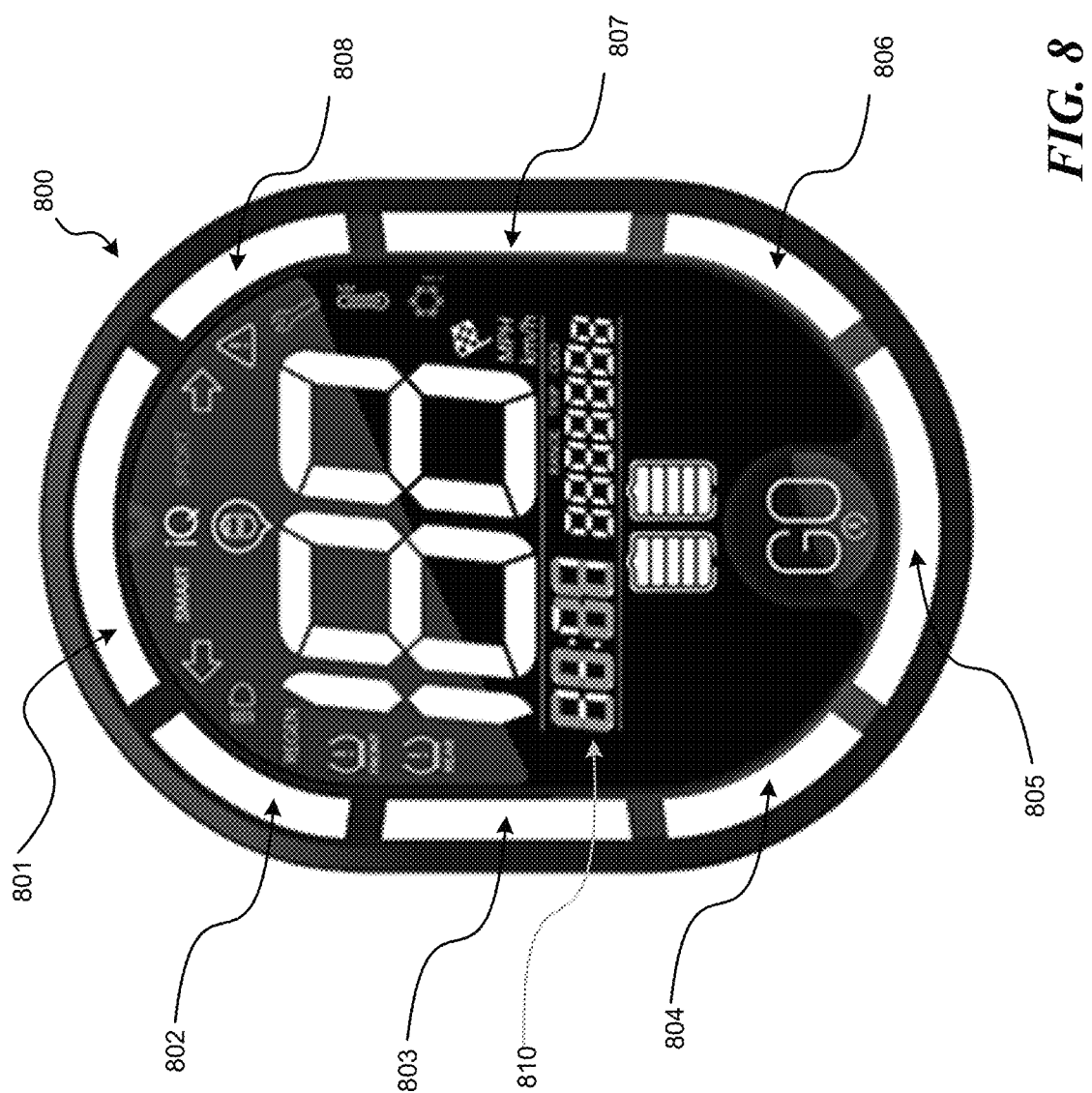
FIG. 8 is a schematic diagram illustrating a user interface of a vehicle in accordance with embodiments of the disclosed technology.

In the illustrated embodiments shown in FIG. 1C, the vehicle can change status through transitions T1-T6. For example, transition T1 includes a user using a key fob (or a keyless control on a mobile phone/smart watch) to transmit a signal regarding unlocking the vehicle, then the vehicle is activated to the "Power on" status from the "Power off" status after receiving the signal. In some embodiments, a physical lock accommodating a physical key can be disposed on the vehicle. The signal regarding unlocking the vehicle can be transmitted from the physical lock internally when the physical lock in unlocked by the inserted physical key. Transition T2 includes, for example, pressing a button (e.g., a "GO" button shown on a dashboard or a mobile device, as shown in FIG. 8) together with holding a brake lever of the vehicle. Through transition T2, the engine or the motor of the vehicle can be turned on. Transition T3 can turn off the engine or the motor of the vehicle by pressing a button or kicking/operating a side stand of the vehicle. Transition T4 can turn off power of the vehicle by operating a key fob, a keyless control, etc. In some embodiments, the power can be turned off after a period of time of no operation.

The present technology can enhance the security of the vehicle by implementing the "security boost" feature in transition T5 or T6, or both. For example, in transition T5, the present technology can ask a user to enter a passcode (e.g., by operating one or more input devices of the vehicle as described) when the user wants to start the engine or the motor. As another example depicted in FIG. 1D, when a user wants to turn on the power of the vehicle (e.g., indicated as transition T1), the present technology can also ask the user to enter a passcode (transition T5). This arrangement provides higher security level for the vehicle because it requires at least two mechanisms (e.g., keys and passcode that is input by operating one or more vehicle controls or input devices) in order to turn on the power or the engine/motor of the vehicle. The controller of the vehicle (e.g., the ECU or processor of the vehicle) may switch the first/second input devices from their "operational modes" to passcode-input modes" during transition T4 or T1, and switch the modes back to their operational modes during transition T2 (e.g., in the embodiments corresponding to FIG. 1C) or in the status condition "power on/engine off" (e.g., in the embodiments corresponding to FIG. 1D).

Figure 1D:
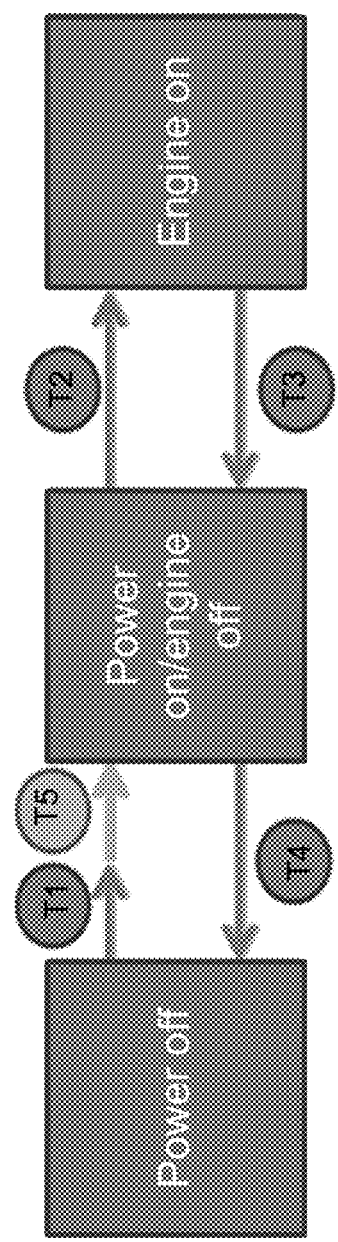
FIG. 1D is a schematic diagram illustrating multiple statuses of a vehicle in accordance with embodiments of the disclosed technology.

It is noted the embodiments illustrated in FIG. 1C and FIG. 1D can have different hardware configurations of the vehicle. For example, if the vehicle is allowed to "enable" the dashboard (e.g., turn on it so a user can access or read information therefrom) before the "Power on" state, then the embodiments depicted in FIG. 1D can be adapted in that vehicle. In some embodiments, if the vehicle does not allow the dashboard to be enabled before the "Power on" state, then the embodiments depicted in FIG. 1D can be adapted in the vehicle. The user can be banned from having any operation to the vehicle other than entering the passcode. In some embodiments, a user can turn on the engine by entering the passcode (transition T6) without providing a key fob (transition T6). In some embodiments, the vehicle can require a user to both present a key fob and enter a correct passcode, before turning on the engine. So the "security boost" feature can be an alternative way to unlock the vehicle when the user forgets where his key, key fob is and/or his mobile device is missing, or the communication components associated with the key fob or the mobile device is malfunctioned.

In some embodiment, the "security boost" feature can be set as to enable/unlock some other features on the vehicle without turning the power of the vehicle on. For example, the user can use the same way as described above to enter the passcode during transition T5 in FIG. 1D to open the seat cover to access the compartment disposed under the seat cover. The features can also include enabling the front light, setting different light pattern of the dashboard or sound profile to the dashboard, etc. In some embodiments, the vehicle can allow a user to enter more than one set of passcodes to enable/unlock the corresponding features.

In some embodiments, transition T5 can include using biometric information (such as fingerprints, palm prints, face or retina recognition, etc.) to verify a user's identity to access the vehicle. In some embodiments, the verification could be performed by a mobile phone (which may be wirelessly connected to the vehicle), a set-up box mounted on/in the vehicle, the vehicle itself (e.g., a biometric sensor incorporated or embedded in the vehicle), etc.

Figure 2B:
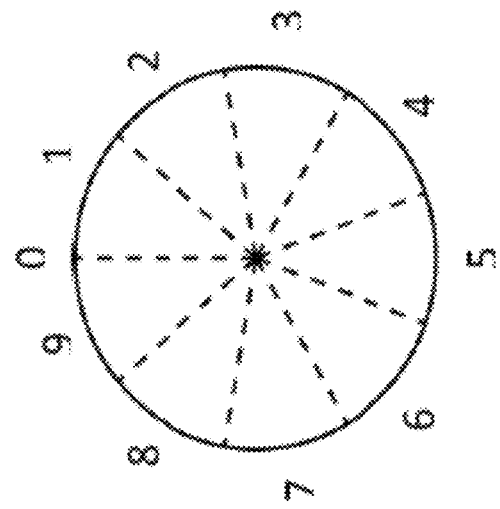
FIG. 2B is a schematic diagram illustrating relationships between divided angle ranges and passcode components in accordance with embodiments of the disclosed technology.
Figure 2A:
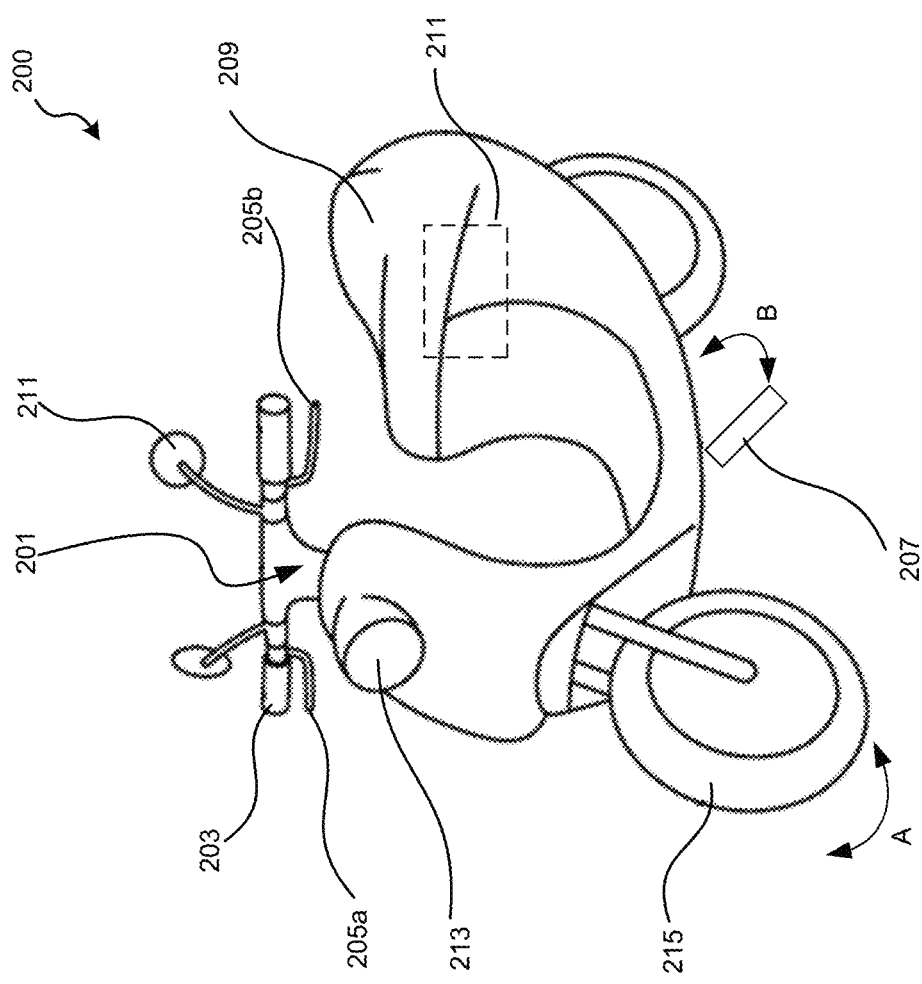
FIG. 2A is a schematic diagram illustrating a vehicle and its components that can serve as input devices in accordance with embodiments of the disclosed technology.

FIG. 2A is a schematic diagram illustrating a vehicle 200 and its components that serve as input devices in accordance with embodiments of the disclosed technology. The vehicle 200 includes handle bars 201 configured to steer or handle the vehicle 200. As shown, a throttle 203 is coupled to one end of the handle bars 201 and is configured to produce an electrical signal or move a cable that in turn controls the speed of the vehicle 200. As shown, a first brake lever 205a is positioned adjacent to the throttle 203 and is configured to control a first brake (e.g., a front wheel brake) of the vehicle 200. At the other end of the handle bars 201 is a second brake level 205b configured to control a second brake (e.g., a rear wheel brake) of the vehicle 200.

The vehicle 200 includes a side stand 207 positioned in a lower portion of the vehicle 200. The side stand 207 is configured to support the vehicle 200 (by contacting the ground) when the vehicle 200 is not moving. The vehicle 200 also includes a seat (or a storage cover) 209 that is configured to support a rider and to cover a storage chamber 211 inside the vehicle 200. As shown, the vehicle 200 includes an adjustable headlight 213 configured to emit light at different angles and/or emit various types of light beams (e.g., high beam or low beam). The vehicle 200 further includes a rearview mirror 211 configured to provide a rider rear views of the vehicle 200. In various embodiments, one or more of the vehicle components discussed above can be used as "input devices" described in the embodiments of the present technology.

For example, the handle bars 201 can be operated or rotated so to move a front wheel 215 of the vehicle 200 in an angle range (e.g., 100 degrees) along direction A. The present technology includes an angle sensor that measures the angle of the handle bars (e.g., the first input device) and provides the measurement to a processor that determines if the detected angle falls into one of a number of defined angle ranges (e.g., 0-9, 10-19, 20-29, 30-39, 40-49, 50-59, 60-69, 70-79, 80-89, and 90-99 degrees), each of which represents a passcode component (e.g., numbers 0-9). In some embodiments, the location and/or movement can be measured by an optical or electrical sensor coupled to the handle bars 201. Accordingly, a user can input passcodes or a portion thereof by operating the handle bar 201 (e.g., positioning it at a specific angle).

Similarly, the side stand 207 can be operated or rotated along direction B and can be configured to enable a user to input passcodes or confirm a code component by positioning the side stand 207 in a particular position. The throttle 203, the first/second brake levers 205a, 205b, and the storage cover 209 can also be operated in individual angle ranges such that can be configured to enable a user to input passcodes or confirm passcode components in the way similar to those of the handle 201 and the side stand 207 mentioned above. For example, the pressure with which a brake lever is squeezed can also be detected and divided into a range (high pressure or less pressure) and used to form a passcode or component thereof. Similarly, the time with which a component is actuated can also be used to enter a code. For example, squeezing the front brake lever for 2 seconds may not generate a passcode but squeezing for 5 seconds may signify a portion of a passcode. The particular passcode can be defined by the user using an application on their mobile computing device. For example, the user may request that their secret code comprise turning the handle bars 45 degrees to the right and squeezing the back brake handle for some period of time between 4 and 5 seconds.

FIG. 2B is a schematic diagram illustrating relationships between divided angle ranges and passcode components. In the illustrated embodiments, a total angle range of an input device is 360 degrees. The total angle range can be divided into nine individual angle ranges (e.g., 40 degrees), each of which represents a passcode component (e.g., numbers 1-9). In the illustrated embodiments, when the input device is located at its initial position, the corresponding passcode component is set as "0." In other embodiments, the total angle range can be divided into different numbers of individual angle ranges, depending on the types of input devices and/or other suitable factors (e.g., the types of passcode components). In some embodiments, individual angle ranges can vary (e.g., one is 30 degrees and another is 50 degrees), depending on design needs or user preferences.

In some embodiments, the input device (e.g., throttle 203) can be a "signalized" or "digitalized" input device. In such embodiments, a controller (e.g., an ECU) or processor of the vehicle 200 can use digital signals to control the input device. For example, the controller can use voltage signals to control the throttle 203 (e.g., voltage levels correspond to throttle levels). In such embodiments, the present technology can directly detect the digital signals and then accordingly identifies corresponding passcode components.

In some embodiments, the input device can be an "analog" input device (e.g., a handle bar). In such embodiments, the present technology uses a sensor (e.g., coupled to a controller of the vehicle) to detect a movement or rotation of the analog input device, and then accordingly identifies corresponding passcode components.

In some embodiments, the storage cover 209 can be locked and require a passcode (e.g., a combination of operations performed on the other input devices) to unlock. Once the storage cover 209 is unlocked, it can then be operated as one of the input devices (e.g., the storage cover 209 can be positioned at various angles/locations, each of which corresponds to a passcode component). This arrangement provides a user a relatively high security level because it requires two set of passcode combinations (which can correspond to the same passcode, in some embodiments) to unlock the vehicle 200.

In some embodiments, the adjustable headlight 213 can also be used to input a code by, for example, turning the high beam on and off in a particular time sequence. Therefore, it can also be configured to enable a user to input passcodes.

Similarly, in some embodiments, the rear mirror 211 can also be adjusted in a range (e.g., be rotated or moved). Therefore, the rearview mirror 211 can also be used as an input device as described above.

Figure 3:
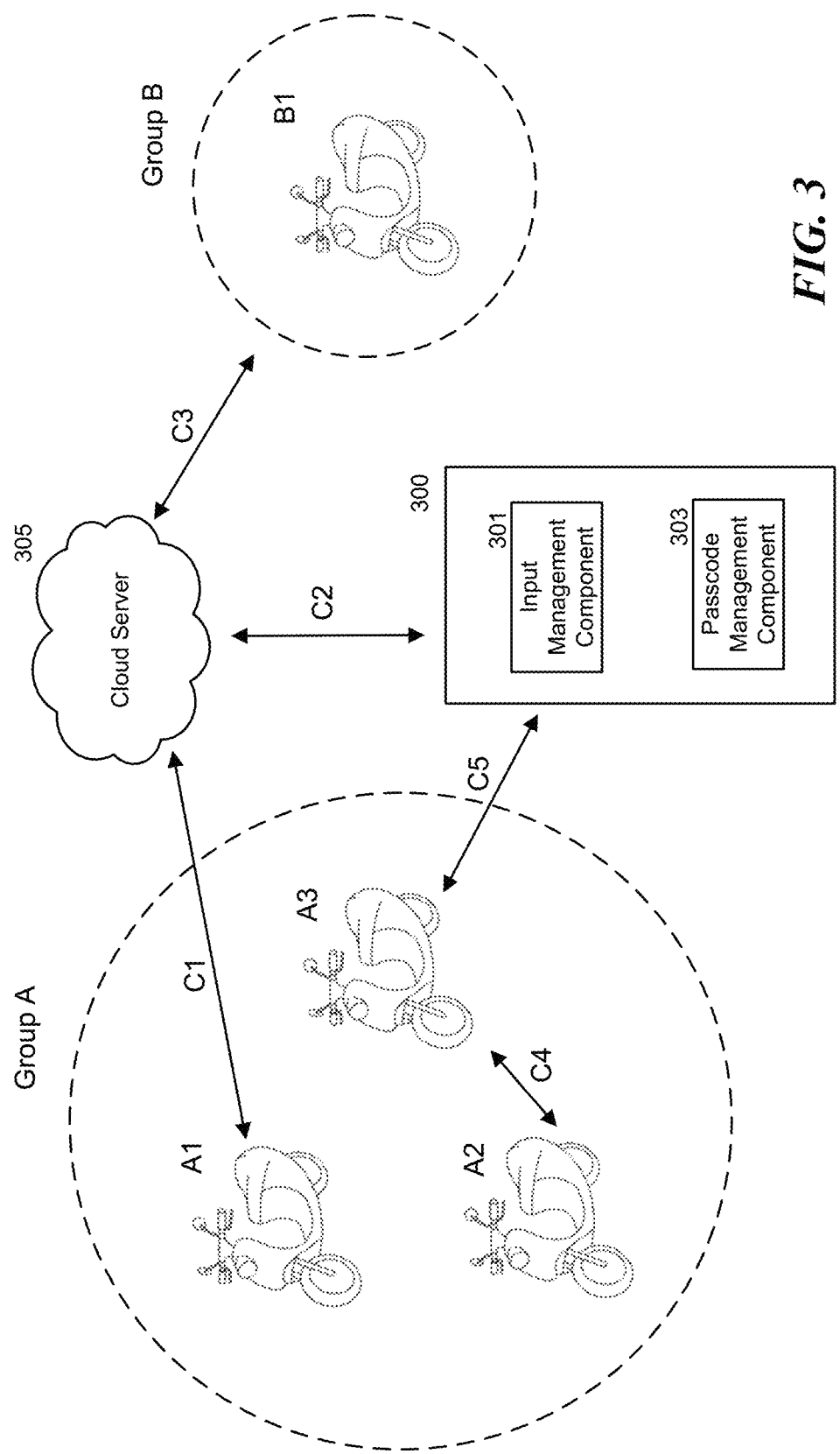
FIG. 3 is a schematic diagram illustrating a vehicle security system in accordance with embodiments of the disclosed technology.

FIG. 3 is a schematic diagram illustrating a vehicle security management system 300 in accordance with embodiments of the disclosed technology. As shown in FIG. 3, the system 300 can manage/receive passcodes from various groups (e.g., Group A and Group B) of vehicles. The system 300 can include (1) an input management component 301 configured to receive passcodes from a vehicle of one of the groups, and (2) a passcode management component 303 configured to manage, maintain, and/or update passcodes for the various groups of vehicles. The input management component 301 can have functions similar to those of the input management component 103 discussed above.

For example, the vehicles in Group A (e.g., vehicle A1, A2, and A3) can be the vehicles owned by a company located in area A. The vehicles in Group B can be another set of vehicles owned by the same company in area B. The present technology enables the company to manage the passcodes for all the vehicles in a centralized, effective fashion. For example, a driver can register an account with the company and purchase a rental plan (e.g., a vehicle or battery rental plan) to use vehicle A1 in area A. In some embodiments, the driver can select a passcode (e.g., by the methods described above, by entering it via his mobile device, etc.). In some embodiments, the passcode can be given by a server. The driver can later purchase another plan (or upgrade his/her existing plan) which allows the driver to use vehicle B1 in area B (e.g., the driver plans to have a business trip in area B). The driver can first input a passcode by operating input devices of vehicle A1. The input management component 301 receives the passcode (e.g., as indicated by arrow C1). Then the passcode management component 303 stores it and then uploads it to a cloud server 305 (e.g., as indicated by arrow C2). The uploaded passcode is then transmitted to, or otherwise be accessible by, vehicle B1 (e.g., as indicated by arrow C3). By this arrangement, the driver can unlock vehicle B1 by the passcode the driver previously created for vehicle A. This is convenient, secure, and effective for the company and the driver.

In some embodiments, the input management component 301 can receive passcodes of one vehicle (e.g., vehicle A2) via another vehicle (e.g., vehicle A3) in the same vehicle group (e.g., arrow C4 and arrow C1). In some embodiments, a vehicle can periodically upload a passcode to the cloud server (e.g., arrow C5).

In some embodiments, the passcode management component 303 can be configured to manage/maintain/update passcodes based on user profile, user activities, user preferences, required security levels, vehicle capacities, etc. For example, the passcode management component 303 can verify whether vehicle A1 and vehicle B1 have a same type of input device before transmitting the passcode to vehicle B1. As another example, the passcode management component 303 can transmit the received passcode to another authorized user according to the driver's user profile (e.g., which has a general authorization allowing a family member to use the driver's vehicles).

Figure 4A:
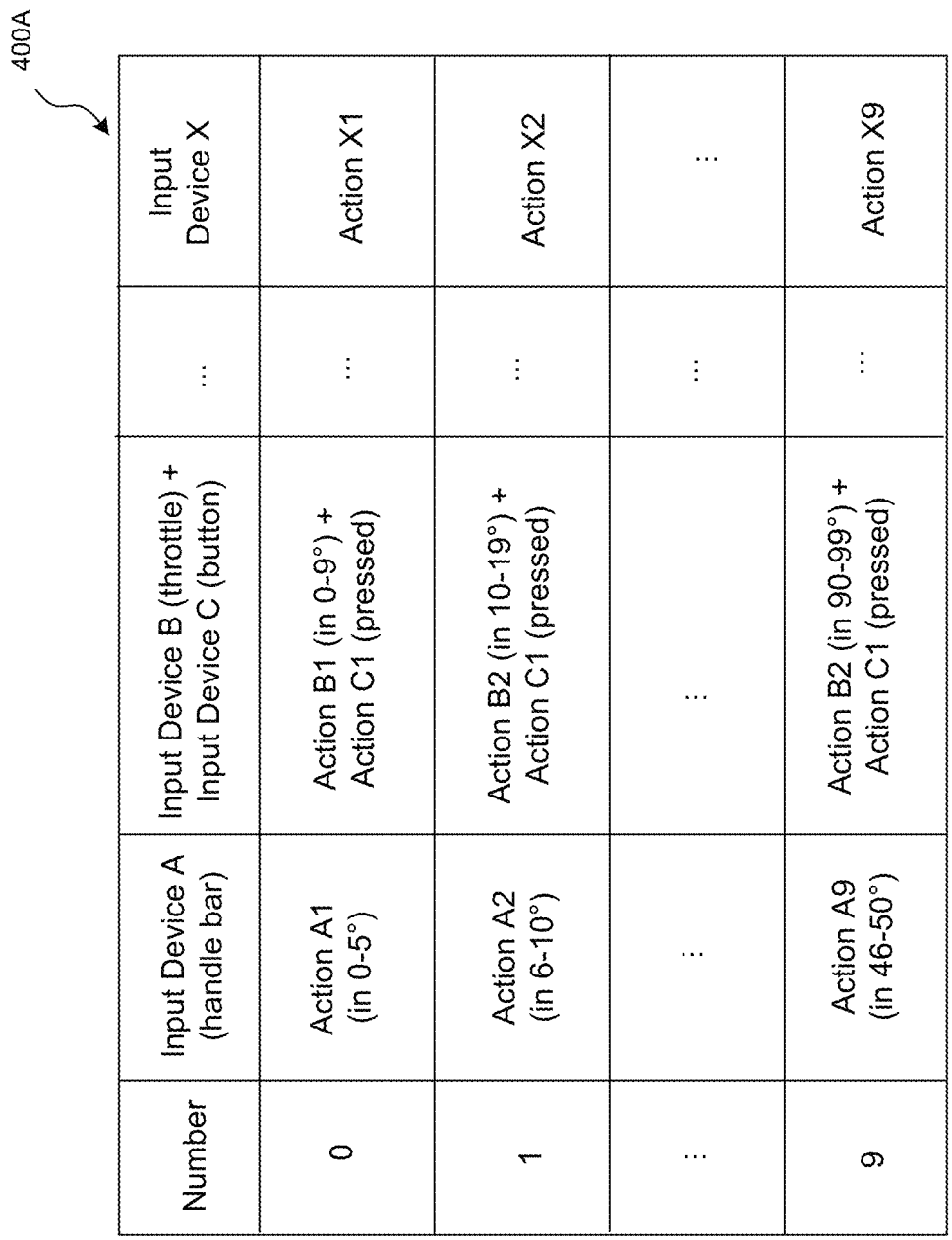

FIGS. 4A and 4B are schematic diagrams illustrating exemplary data structures used in systems in accordance with embodiments of the disclosed technology. FIG. 4A includes an input-index table 400A showing that the relationships between passcode components (in the illustrated embodiment, single-digit numbers 0-9) and input devices A-X of a vehicle. In some embodiments, the input-index table 400A can be created and maintained both by an input management component (e.g., the input management component 103). In other embodiments, the input-index table 400A can be created by an input management component (e.g., the input management component 301) and then be maintained by a passcode management component (e.g., the passcode management component 303).

As shown in FIG. 4A, the present technology enables a user to enter passcode components 0-9 by operating Input device A (e.g., a handle bar) alone. The present technology also enables a user to enter passcode components 0-9 by operating Input Device B (e.g., a throttle) and Input Device C (e.g., a button) at the same time or in a predetermined order (e.g., to operate Input Device B first and then Input Device C, or vice versa). In some embodiments, the present technology enables a user to enter passcode components by operating two or more input devices.

FIG. 4B includes another type of input-index table 400B. In such embodiments, the input-index table 400B can include various combinations of the operations/status of the input devices A-X of a vehicle. Each of the combinations can correspond to a particular type of enabling/unlocking action. For example, combination 401 corresponds to "unlock power" (e.g., transit to "Power on" status) combination 403 corresponds to "unlock engine" (e.g., transit to "Engine on" status) and combination 405 corresponds to "unlock seat cover" for accessing a compartment of the vehicle under the seat cover. In some embodiments, one or more of the input devices A-X can be a component of a mobile device. For example, a user can input a first portion of a passcode via the position of the handlebars of a vehicle, and then input a second portion of the passcode via a touch screen of a smartphone. In such embodiments, the system can combine the two portions of the passcode and then use the combined passcode to perform an authentication process. Having input devices from multiple sources can accordingly enhance security.

Figure 5:
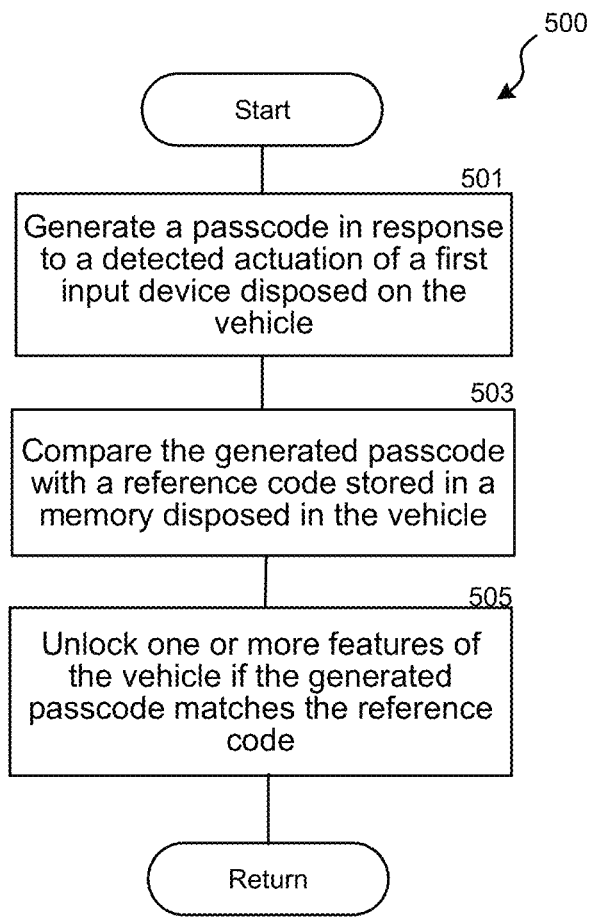
FIG. 5 is a flowchart illustrating a method in accordance with embodiments of the disclosed technology.
Figure 6:
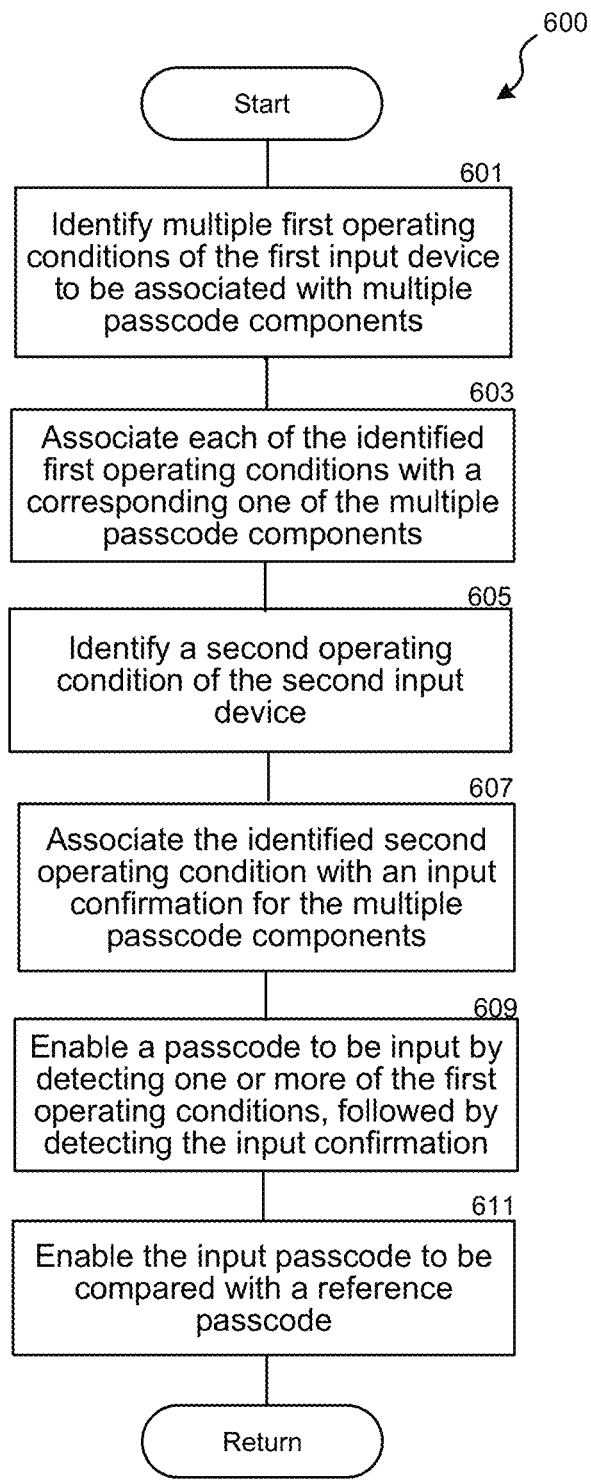
FIG. 6 is a flowchart illustrating a method in accordance with embodiments of the disclosed technology.

FIGS. 5 and 6 are flowcharts illustrating methods 500 and 600 in accordance with embodiments of the disclosed technology. The method 500 can be used to unlock a vehicle having a first input device (and a second input device also). The method 500 can be implemented by a vehicle, a mobile device, a stand-alone chip set or circuitry, or other types of suitable devices. The method 500 starts at block 501 by generating a passcode in response to a detected actuation of a first input device disposed on a vehicle. In some embodiments, the "detected actuation" can include a rotation of the first input device and/or a holding operation of the first input device. In some embodiments, the first input device can be a button, throttle, handle, lever, steering wheel, handle bar, pedal, paddle, shifter, side stand, trunk lid, fuel lid/cap, power plug or other suitable components. The passcode is input by operating one or more of the input devices in a first predetermined way. For example, in the embodiments where the first input device is a throttle, the passcode can be input by rotating the throttle to a particular angle (or positioning the throttle in a particular angle range). The particular angle corresponds to a particular passcode component (e.g., 1-9, A-Z, etc.).

In some embodiments, the method 500 can (1) identifying an operational condition of the first input device; (2) generating at least one passcode component in response to the operational condition of the first input device; (3) identifying a confirmatory operation of a second input device; and (4) confirming the generated passcode component in response to the confirmatory operation of the second input device. In some embodiments, the first operation conditional of the first input device can include rotating the first input device so as to position the first input device at a predetermined angle. In some embodiments, the passcode component can be generated according to the predetermined angle (e.g., FIG. 2B).

In some embodiments, the "operational condition" and the "confirmatory operation" can be from the same device. For example, the method 500 can include: (1) identifying a first operational condition (e.g., rotating) of the first input device; (2) generating the passcode component in response to the first operational condition of the first input device; (3) identifying a second operational condition (e.g., holding the first input device for a preset period of time) of the first input device; and (4) confirming the generated passcode component in response to the second operational condition. In some embodiments, the second operational condition can include positioning the first input device at a predetermined angle for a preset period of time.

In some embodiments, the method 500 can receive a confirmation of the passcode from the second input device (e.g., by the confirmatory operation described above). In some embodiments, the second input device can be a button, throttle, handle, lever, steering wheel, handle bar, pedal, paddle, shifter, side stand, trunk lid, fuel lid/cap, power plug or other suitable components. The second input device is configured to confirm or "enter" a passcode component input by the first input device. For example, when a user operates the first input device (e.g., rotate the throttle), a display (e.g., dashboard display or a display of a mobile device) can present a candidate passcode component to the user. Using FIG. 2B as example, when the user rotates the first input device from zero degree to 359 degrees, the display presents individual passcode components 0 to 9, depending on which angle range the first input device is currently in. When the user rotates and positions the first input device in a target angle range (which corresponds to a passcode component the user would like to input), the user then operates the second input device to confirm the user's input. The confirmation is input by operating the second input device in a second predetermined way. For example, in some embodiments, the confirmation can be a single click of a button. In some embodiments, the confirmation can be a combination of multiple operations. For example, the confirmation can be a user holding the first brake lever 205a and the second brake lever 205b at the same time. As another example, the confirmation can include a user pulling the first brake lever 205a twice and then pulling the second brake lever 205b once. In other embodiments, the confirmation can include various combinations of operations of one or more input devices.

In some embodiments, the first input device and the second input device can be the same input device (e.g., with different operations for "passcode component input" and "confirmation"). For example, a user can operate the first input device (e.g., the handlebars) and then maintain the first input device at a location or an angle for a particular period of time (e.g., 2 seconds). After the period of time, the passcode component corresponding to that location or angle is considered "confirmed" and then is entered.

At block 503, the method 500 continues comparing the generated passcode with a reference code stored in a memory disposed in the vehicle. In some embodiments, the reference code can be stored in other suitable device such as a remote server.

At block 505, the method 500 then enables/unlocks one or more features of the vehicle if the generated passcode matches the reference code. In some embodiments, the one or more features can include an operational state of the vehicle, activating a motor of the vehicle, and/or accessing a compartment of the vehicle. In some embodiments, after enabling/unlocking the one or more features of the vehicle, the method 500 can switch the first input device to an operational mode (from a password-input mode, for example). In some embodiments, the method 500 can include receiving a signal (e.g., a user request) regarding unlocking the vehicle before generating the passcode in response to the detected actuation of the first input device disposed on the vehicle. In some embodiments, the signal can set the first input device in the password-input mode.

In some embodiments, the first input device can include two or more input devices. In some embodiments, the second input device can include two or more input devices. The more input devices are utilized, the more combinations of input device operations can be used by a user to enter passcode components. The number of available combinations of input device operations positively correlates to the security level that the present technology can provide. In general, more combinations mean higher security levels.

In some embodiments, the method 500 includes comparing the stored passcode with a reference passcode, and in an event that the stored passcode matches the reference passcode, a signal is produced by a processor to start an engine of the vehicle. In some embodiments, the passcodes can be compared by an ECU. In other embodiments, the passcodes can be compared by a processor of a mobile device.

In some embodiments, the method 500 includes (a) in an event that the input passcode does not match the reference passcode, presenting an indication via a display of the vehicle showing that the passcode is incorrect; and (b) transmitting a signal (e.g., an alarm signal) to a mobile device associated with the vehicle, alerting that an incorrect passcode has been input. For example, the indication can be presented by a dashboard display, a display of a mobile device, etc. In some embodiments, the alert signal can be transmitted to a portable device or a wearable device. The portable or wearable device can further alarm the user by indications based on light, sound, vibration, etc.

In some embodiments, the method 500 can further include (1) identifying a first operating condition of the first input device according to the first predetermined way; (2) generating a first passcode component in response to the first operating condition; (3) identifying a second operating condition of the first input device according to the first predetermined way; (4) generating a second passcode component in response to the second operating condition; and (5) generating the passcode based at least in part on the first passcode component and the second passcode component. In some embodiments, the method 500 can further include (i) visually presenting the first passcode component via a display of the vehicle, and (ii) visually presenting the second passcode component via the display of the vehicle.

In some embodiments, the present technology can include a method 600 for setting up a security system for a vehicle. The vehicle has a first input device and a second input device. In some embodiments, the first and second input devices can be separate components. In other embodiments, the first and second input devices can be a single input device. The method 600 can be implemented in a vehicle, a mobile device, a stand-alone chip set or circuitry, a server, or other types of suitable devices.

As shown in FIG. 6, the method 600 includes identifying multiple first operating conditions of the first input device to be associated with multiple passcode components (block 601). For example, the method 600 enables a user to set up the relationships between each of the operations (e.g., to be positioned at a location) of the first input device and individual passcode components (e.g., 1-9, A-Z, etc.). At block 603, the method 600 associates each of the identified first operating conditions with a corresponding one of the multiple passcode components. The relationships can be stored as a table such as those shown in FIGS. 4A and 4B.

The method 600 includes identifying a second operating condition of the second input device (block 605). The identified second operating condition is then associated with an input confirmation for the multiple passcode components (block 607). The method 600 then enables a user to input the passcode components and then confirm the same by detecting the input confirmation (block 609). At block 611, the input passcode is compared with a reference passcode for authentication of the user. Once authenticated, the security system produces a signal to turn on power of the vehicle or an engine of the vehicle (e.g., as shown in FIG. 1C).

Figures 7A, 7B:
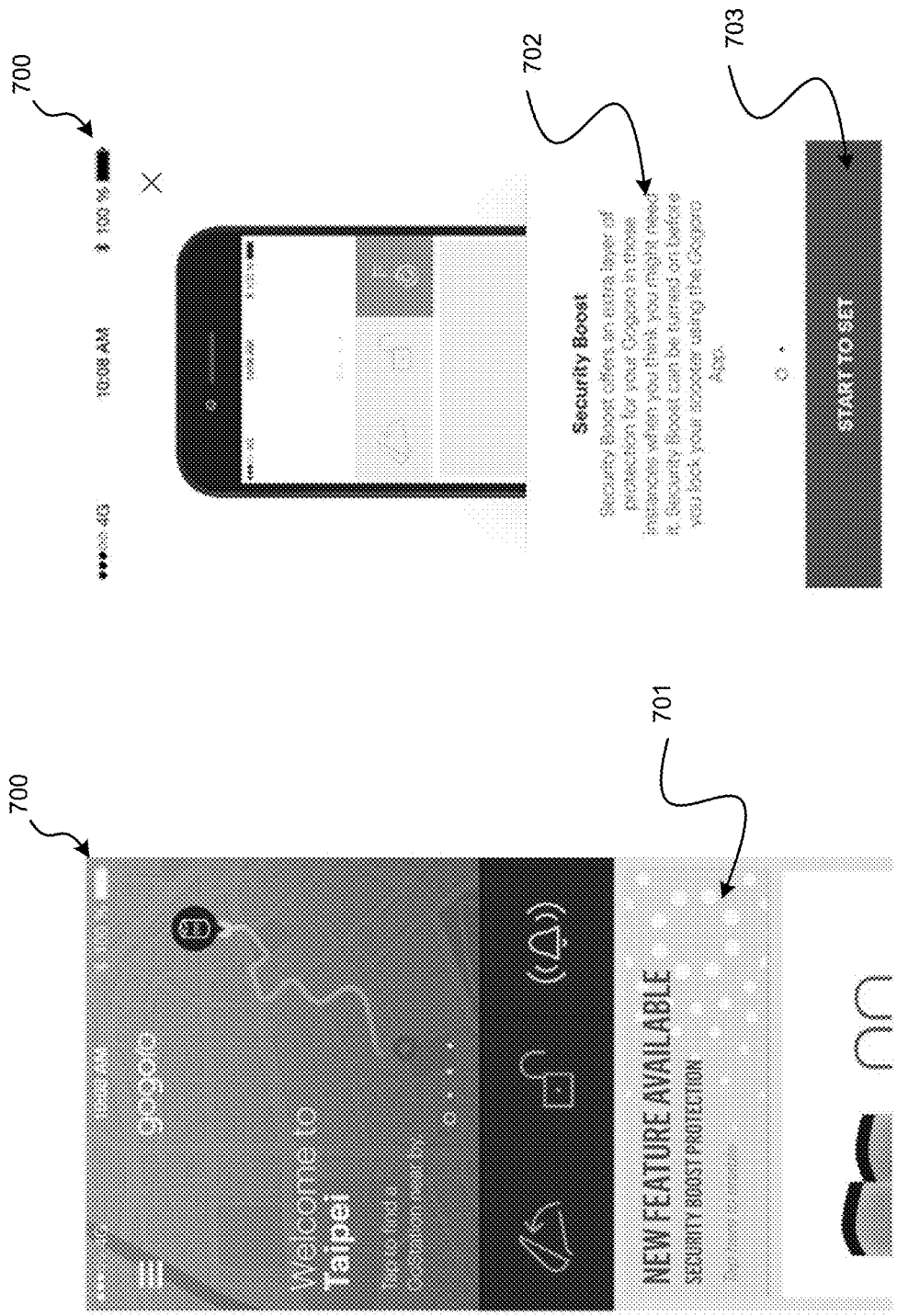
FIGS. 7A-7E are screenshots illustrating a user interface of the system in accordance with embodiments of the disclosed technology.

FIGS. 7A-7E are screenshots illustrating a user interface 700 of the system in accordance with embodiments of the disclosed technology. In some embodiments, the user interface 700 can be visually presented on a display of a mobile device (e.g., a smartphone, a tablet, etc.). In some embodiments, the user interface 700 can be visually presented on any other suitable display such as a dashboard display. In FIG. 7A, the user interface 700 enables a user to initiate a setup process for a vehicle security system (e.g., referred to as "security boost protection" in FIG. 7A) by clicking a virtual button 701. In some embodiments, the virtual button 701 can be presented to the user after the user initiates an application that can communicate with, or control, an electric vehicle (e.g., a "Gogoro" scooter). Once the user clicks the virtual button 701, the user interface 700 then presents a description 702 regarding the vehicle security system, as shown in FIG. 7B. The description 702 is scrollable to enable the user to view multiple pages of content in the description 702. As shown in FIG. 7B, the user interface 700 also provides a virtual start button 703 for the user to click and initiate the setup process.

Figures 7C, 7D:
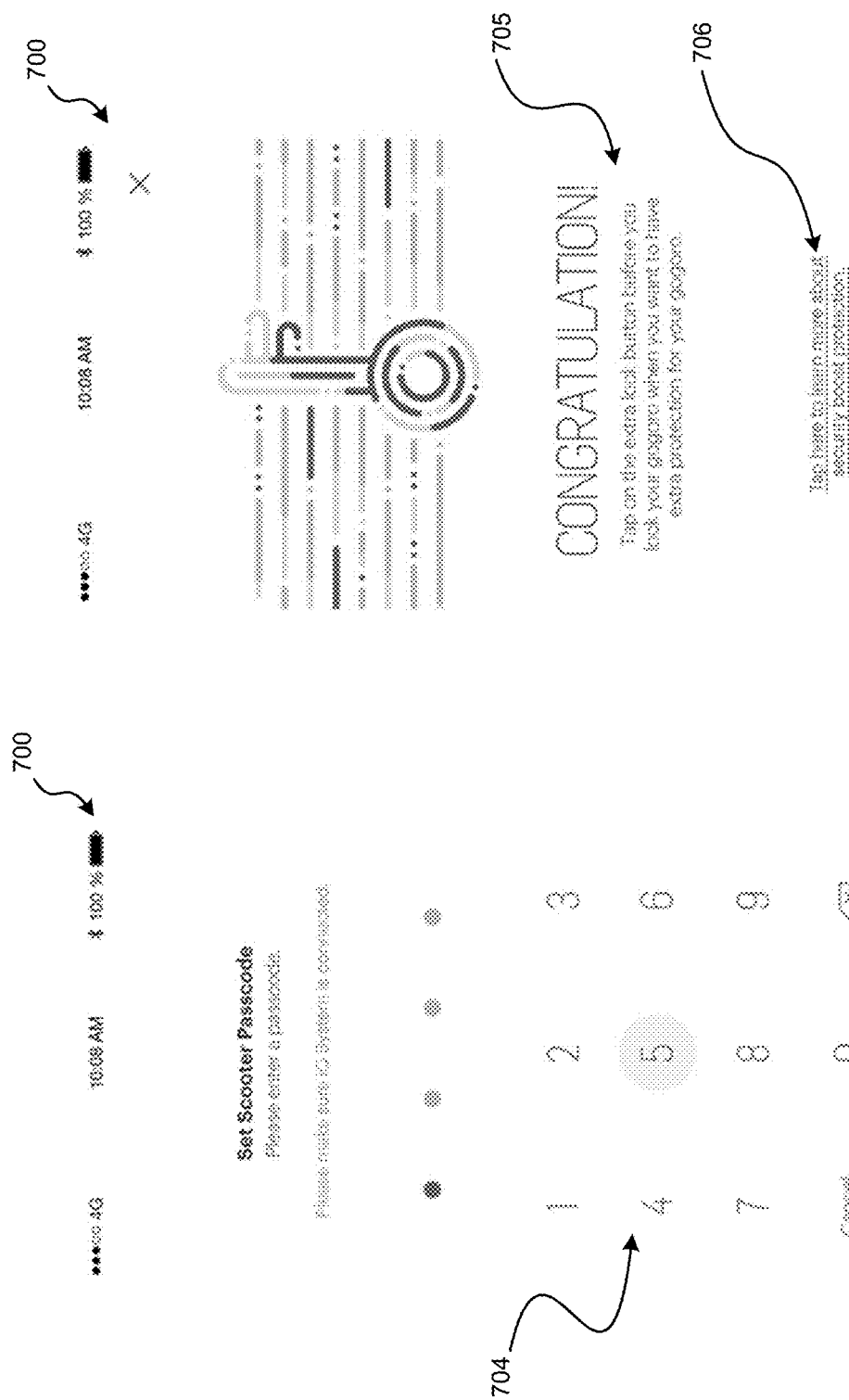

After the user clicks the virtual start button 703, the user interface 700 then presents a virtual keypad 704 for the user to enter a passcode, as shown in FIG. 7C. The entered passcode is stored and then used as a reference passcode for an authentication process. Once the passcode is entered, the user interface 700 then prompts for a confirmation 705, as shown in FIG. 7D. The user interface 700 can also provide a link 706, which enables the user to access further information regarding the vehicle security system.

Figure 7E:
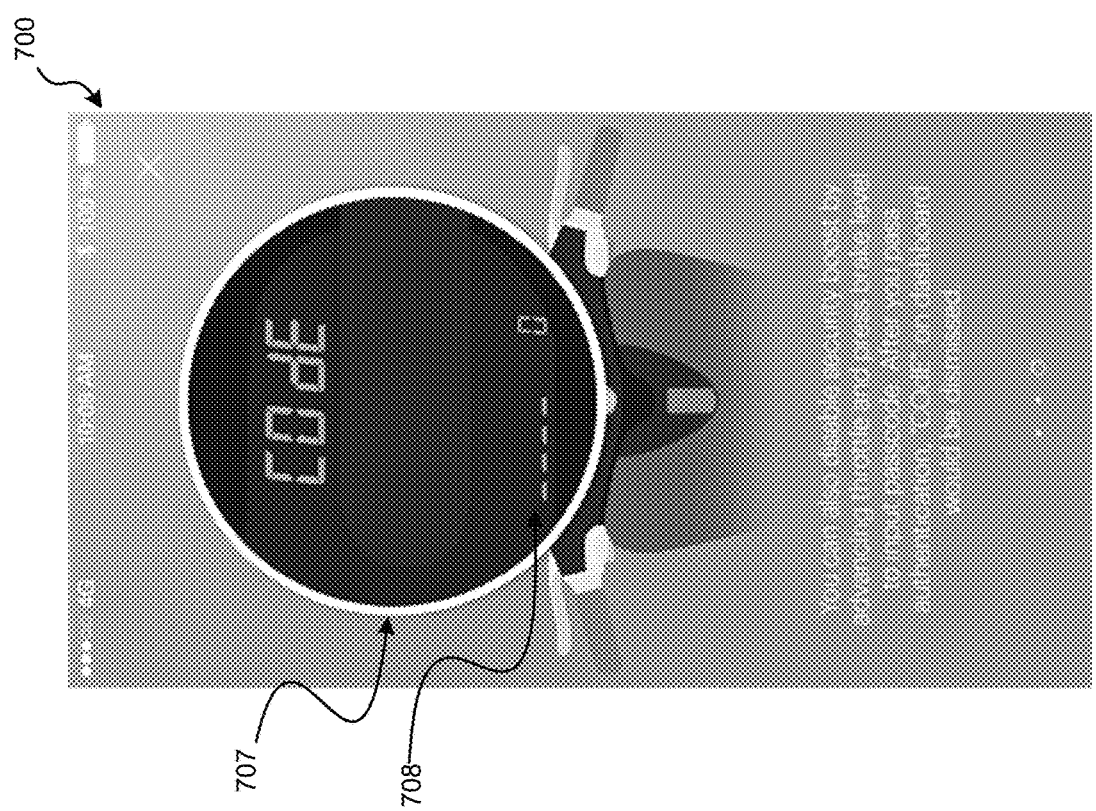

Once the passcode is set, the user interface 700 can then initiate an input-device setup process for the user to define relationships between multiple passcode components and the operations/statuses of an input device of the electric vehicle. For example, as shown in FIG. 7E, the user interface 700 can present a dashboard-like image 707, which is configured to provide relevant information during the input-device setup process or serves as a tutorial interface. The dashboard-like image 707 can include a passcode display area 708 for displaying passcode components. The passcode display area 708 is configured to display passcode components (e.g., 4 single-digit numbers, in the illustrated embodiment) during the input-device setup process. In other embodiments, the passcode display area 708 can also be used to display a passcode during the setup process described above with reference to FIGS. 7A-7D. In some embodiments, passcode information entered in the user's mobile device is then sent to the vehicle where it is stored and used in the authentication process.

FIG. 8 is a schematic diagram illustrating a user interface 800 of a vehicle in accordance with embodiments of the disclosed technology. In some embodiments, the user interface 800 can be visually presented on a display (e.g., the dashboard display 119) of a vehicle. In other embodiments, the user interface 800 can be visually presented in other types of display (e.g., a display of a mobile device). As shown, the user interface 800 includes eight indication portions 801-808. In some embodiments, the indication portions 801-808 are configured to visually present the passcode components during the input-device setup process. For example, each of the indication portions 801-808 can be visually presented in different colors, at different brightness levels, or at different blinking frequencies. The combinations of the visual presentations of the indication portions 801-808 can effectively provide the user which passcode component is being set during the input-device setup process.

For example, assuming that an input device of a vehicle, e.g., throttle, can be rotated in a range of 100 degrees. The range can be divided by ten such that each divided degree range (e.g., a 10-degree range) represents a single digit number (e.g., 0 to 9). In such embodiments, the user interface 800 can present these ten passcode components by using the visual combinations of the indication portions 801-808. For example, the user interface 800 can darken all of the indication portions 801-808 to represent digit "0," brighten only the indication portion 801 to indicate digital "1," brighten only the indication portion 802 to indicate digital "2," brighten all of the indication portions 801-808 to represent digit "9," and so on. By this arrangement, the user interface 800 can provide sufficient visual indication to guide the user through the input-device setup process.

As shown in FIG. 8, a 4-letter term "Code" can be displayed in a timer section 810 of the user interface 800. When a user operates an input device to input or set up a 4-digit passcode (which has four single-digit passcode components), each letter of the term "Code" can be changed accordingly so as to show the four passcode components to the user. In other embodiments, the 4-letter term "Code" can be displayed in other areas of the user interface 800 (e.g., in an odometer section 812, a mileage section 814, etc.). In some embodiments, the present technology can have other types of terms (e.g., longer or shorter) to represent a passcode. In some embodiments, the term "Code" can be displayed in a small font such that it cannot be easily seen by a bystander.

As discussed above the security boost feature can be used not only to allow operation of the vehicle but can also be used to unlock features of the vehicle. For example, if a scooter is shared by a father and a teenage son, the security boost feature can be used to allow the father to operate the vehicle at faster speeds than those permitted for the son etc. Similarly, the control of the vehicle unlock by the security boost feature may allow operation in different times of the day such as after 11 p.m. etc.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method for operating a vehicle, comprising:
generating a passcode in response to a detected actuation of a first user input device disposed on the vehicle, wherein the detected actuation comprises a rotation of the first user input device and a holding operation of the first user input device, wherein the rotation of the first user input device and the holding operation of the first user input device are continuous and confirmed by a confirmatory operation of a second user input device disposed on the vehicle, wherein the second user input device is configured to perform at least one vehicular function, wherein the first user input device is configured to provide three or more angle inputs in one operation, and wherein the generated passcode includes one or more single-digit numbers or symbols;
visually displaying, via a user interface, each of the single-digit numbers or symbols while generating the passcode;
comparing the generated passcode with a reference code stored in a memory disposed in the vehicle, wherein the reference code is received from a remote server; and
enabling one or more features of the vehicle if the generated passcode matches the reference code.

2. The method of claim 1, wherein the first user input device includes a rotatable throttle control handle, a functional button, a handle, a lever, a steering wheel, a handle bar, a paddle, a pedal, a shifter, a side stand, a trunk lid, a fuel lid, a fuel cap, or a power plug.

3. The method of claim 1, wherein the one or more features comprise an operational state of the vehicle, activating a motor of the vehicle, unlocking a seat cover of the vehicle, and accessing a compartment of the vehicle.

4. The method of claim 1, wherein after unlocking the one or more features of the vehicle, the method further comprises:
switching the first input device to an operational mode.

5. The method of claim 1, wherein before generating the passcode in response to the detected actuation of the first user input device disposed on the vehicle, the method further comprises:
receiving a signal regarding unlocking the vehicle.

6. The method of claim 1, wherein the generated passcode comprises at least one passcode component, and wherein the method comprises:
identifying an operational condition of the first user input device;
generating the at least one passcode component in response to the operational condition of the first user input device;
identifying the confirmatory operation of the second user input device; and
confirming the generated passcode component in response to the confirmatory operation of the second user input device.

7. The method of claim 6, wherein:
the first user input device of the vehicle includes a rotatable throttle-control handle;
the operational condition of the first user input device comprises rotating the first user input device so as to position the first user input device at a predetermined angle, wherein the first user input device is configured to be positioned in multiple ranges of angle, and wherein each of the multiple ranges of angle corresponds to a passcode digit; and the at least one passcode component is generated based on the corresponding passcode digit according to the predetermined angle.

8. The method of claim 1, wherein:
the second user input device includes a brake lever or a brake pedal; and
the confirmatory operation of the second user input device comprises positioning the second user input device at a predetermined location.

9. The method of claim 6, further comprising:
visually presenting the passcode component via a dashboard display of the vehicle.

10. The method of claim 1, wherein before comparing the generated passcode with the reference code, the method further comprises:
receiving the reference code from a mobile device external to the vehicle; and
storing the reference code in the memory of the vehicle.

11. A vehicle, comprising:
a memory;
a processor coupled to the memory;
a first user input device coupled to the processor, wherein the processor is configured to:
generate a passcode, in response to a detected actuation of the first user input device, wherein the detected actuation comprises rotating the first user input device and positioning the first user input device at a predetermined angle, wherein the rotating of the first user input device and the positioning of the first user input device are continuous, wherein the first user input device is configured to be positioned in multiple ranges of angle, and wherein each of the multiple ranges of angle corresponds to a passcode digit, wherein the first user input device is configured to provide three or more angle inputs in one operation, and wherein the generated passcode includes one or more single-digit numbers or symbols;
visually display each of the single-digit numbers or symbols while generating the passcode;
confirm the predetermined angle by a confirmatory operation of a second user input device disposed on the vehicle, wherein the second user input device is configured to perform at least one vehicular function;
compare the generated passcode with a reference code stored in the memory, wherein the reference code is received from a remote server; and
enable one or more features of the vehicle if the generated passcode matches the reference code.

12. The vehicle of claim 11, wherein the first user input device includes a rotatable throttle control handle, a functional button, a handle, a lever, a steering wheel, a handle bar, a paddle, a pedal, a shifter, a side stand, a trunk lid, a fuel lid, a fuel cap, or a power plug.

13. The vehicle of claim 11, wherein the one or more features comprise an operational state of the vehicle, activating a motor of the vehicle, unlocking a seat cover of the vehicle, and accessing a compartment of the vehicle.

14. The vehicle of claim 11, wherein the first user input device is in a passcode-input mode, and wherein the processor is configured to switch the first user input device to an operational mode after unlocking the one or more features of the vehicle.

15. The vehicle of claim 11, wherein the generated passcode comprises at least one passcode component, and wherein the processor is configured to:
identify an operational condition of the first user input device;
generate the at least one passcode component in response to the operational condition of the first user input device;
identify the confirmatory operation of the second user input device; and
confirm the generated passcode component in response to the confirmatory operation of the second user input device.

16. The vehicle of claim 11, wherein:
the second user input device includes a brake lever or a brake pedal; and
the confirmatory operation of the second user input device comprises positioning the second user input device at a predetermined location.

17. A system for unlocking a vehicle, comprising:
a processor;
a first user input device coupled to the processor, wherein the processor is configured to:
generate a passcode, in response to a detected actuation of the first user input device, wherein the detected actuation comprises rotating the first user input device and positioning the first user input device at a predetermined angle, wherein the rotating of the first user input device and the positioning of the first user input device are continuous, wherein the predetermined angle is confirmed by a confirmatory operation of a second user input device disposed on the vehicle, wherein the second user input device is configured to perform at least one vehicular function, wherein the first user input device is configured to provide three or more angle inputs in one operation, and wherein the three or more angle inputs correspond to different single-digit numbers, wherein the generated passcode includes one or more single-digit numbers or symbols;
visually display, via a user interface, each of the single-digit numbers or symbols while generating the passcode;
receive a reference code from a remote server;
compare the generated passcode with the reference code; and
unlock one or more features of the vehicle if the generated passcode matches the reference code.

18. The system of claim 17, wherein the processor is configured to:
identify an operational condition of the first user input device;
generate the at least one passcode component in response to the operational condition of the first user input device;
identify the confirmatory operation of the second user input device; and
confirm the generated passcode component in response to the confirmatory operation of the second user input device.

19. The method of claim 1, wherein the passcode is a first passcode, and wherein the detected actuation of the first user input device is a first detected actuation, and wherein the confirmatory operation of the second user input device is a first confirmatory operation, and wherein the method further comprises:
generating a second passcode in response to a second detected actuation of a third user input device disposed on the vehicle, wherein the second detected actuation is confirmed by a second confirmatory operation of the second user input device disposed on the vehicle.

20. The method of claim 19, wherein the reference code is a first reference code, and wherein the one or more features includes a first feature, and wherein the method further comprises:
- comparing the second generated passcode with a second reference code stored in the memory disposed in the vehicle; and
- enabling a second feature of the vehicle if the second generated passcode matches the second reference code.

21. The method of claim 1, wherein each of the single-digit numbers or symbols corresponds to an angular position relative to a center of the user interface.

22. The vehicle of claim 11, further comprising:
- a user interface configured to visually display each of the single-digit numbers or symbols while generating the passcode,
- wherein each of the single-digit numbers or symbols corresponds to an angular position relative to a center of the user interface.

23. The system of claim 17, wherein each of the single-digit numbers or symbols corresponds to an angular position relative to a center of the user interface.

* * * * *